Figures 1, 4:
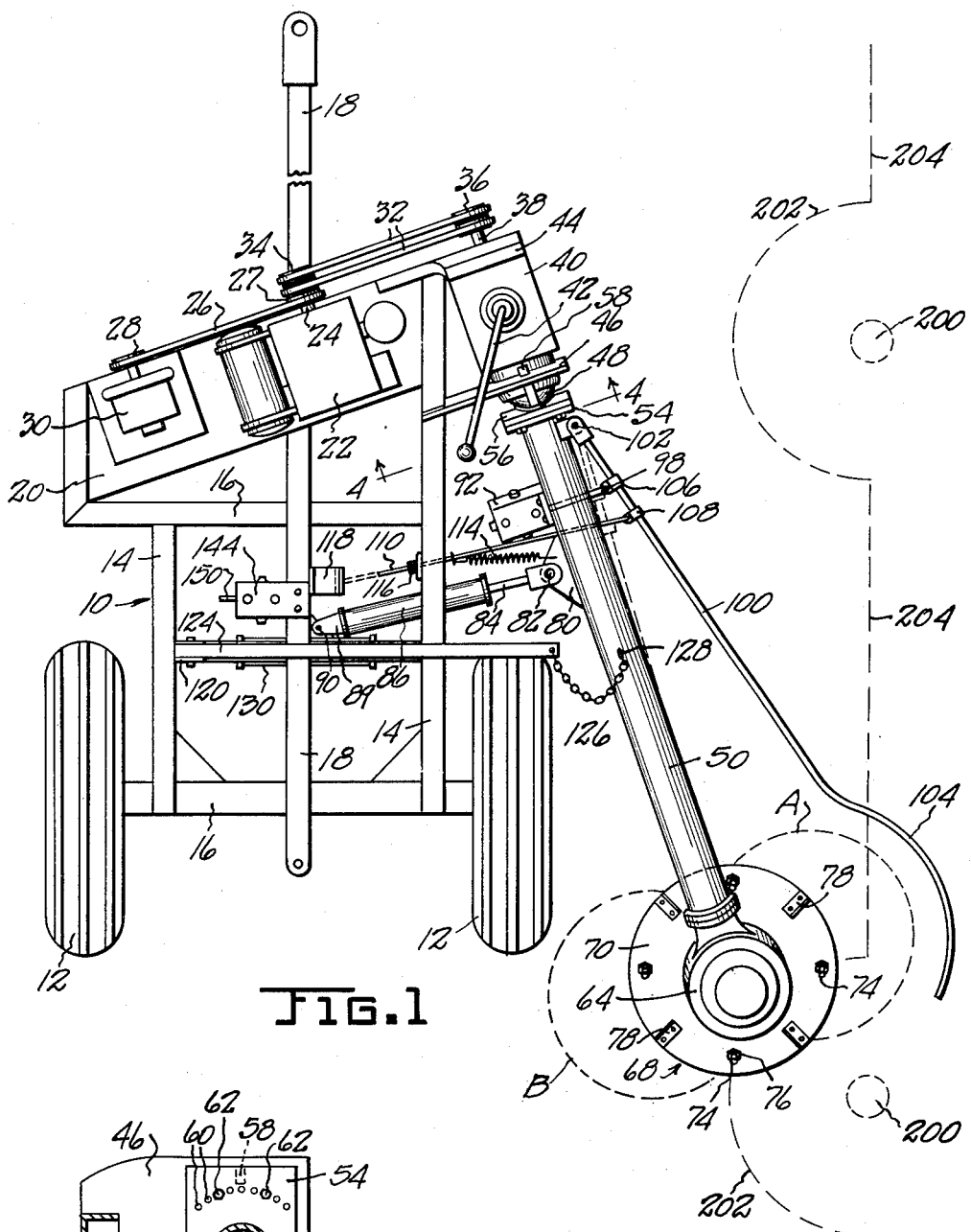

June 12, 1956 D. G. FRIDAY 2,749,824
LATERALLY SHIFTABLE AND TILTABLE ROTARY HOE
Filed March 9, 1953 3 Sheets-Sheet 1

INVENTOR.
DAVID G. FRIDAY.
BY
ATTORNEY

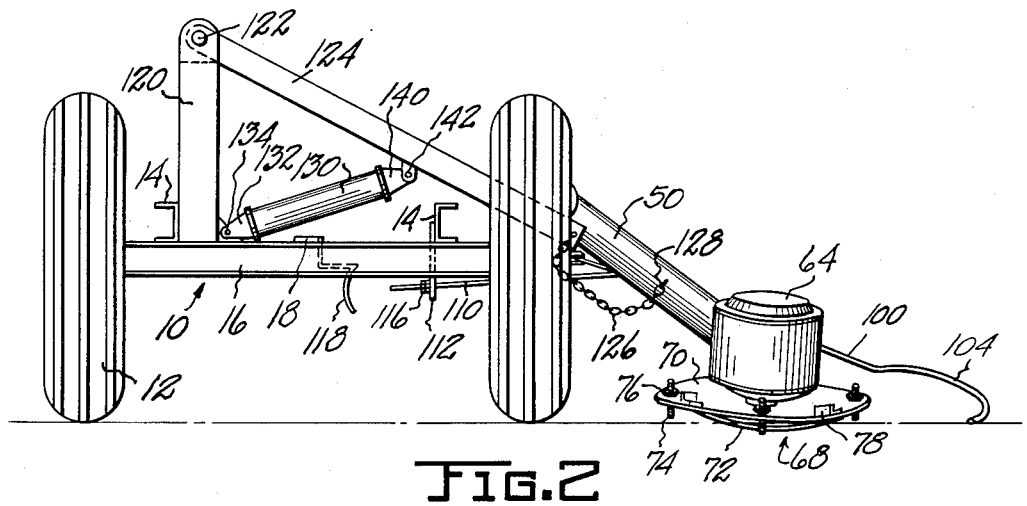
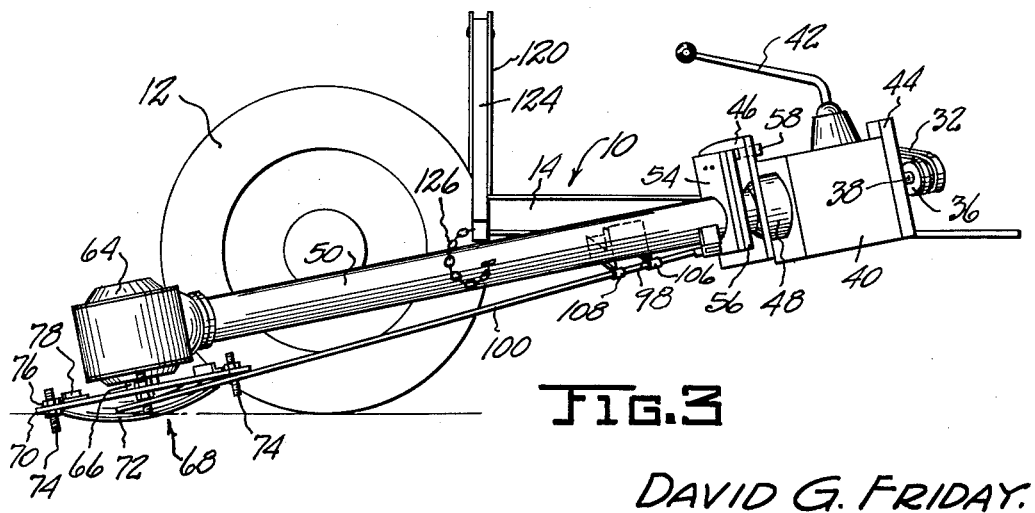

June 12, 1956 D. G. FRIDAY 2,749,824
LATERALLY SHIFTABLE AND TILTABLE ROTARY HOE
Filed March 9, 1953 3 Sheets-Sheet 3

DAVID G. FRIDAY,
INVENTOR.

BY
ATTORNEY

United States Patent Office 2,749,824
Patented June 12, 1956

2,749,824

LATERALLY SHIFTABLE AND TILTABLE ROTARY HOE

David G. Friday, Hartford, Mich.

Application March 9, 1953, Serial No. 341,007

2 Claims. (Cl. 97—43)

This invention relates to improvements in rotary hoes. More particularly, it relates to a power driven implement for breaking or cultivating the soil and adapted to travel in a straight path except as it encounters obstacles in such a path and is deflected to pass around such obstacles.

The primary object of this invention is to provide a novel, simple and efficient device of this character which is trouble-free in operation and low in cost of construction and operation.

A further object is to provide a device of this character with means for shifting a ground-working member laterally with respect to a predetermined path of movement for the purpose of passing around an obstruction in that path and so constructed as to required minimum exertion of power during normal functioning thereof.

Other objects will be apparent from the following specification.

Figure 5:
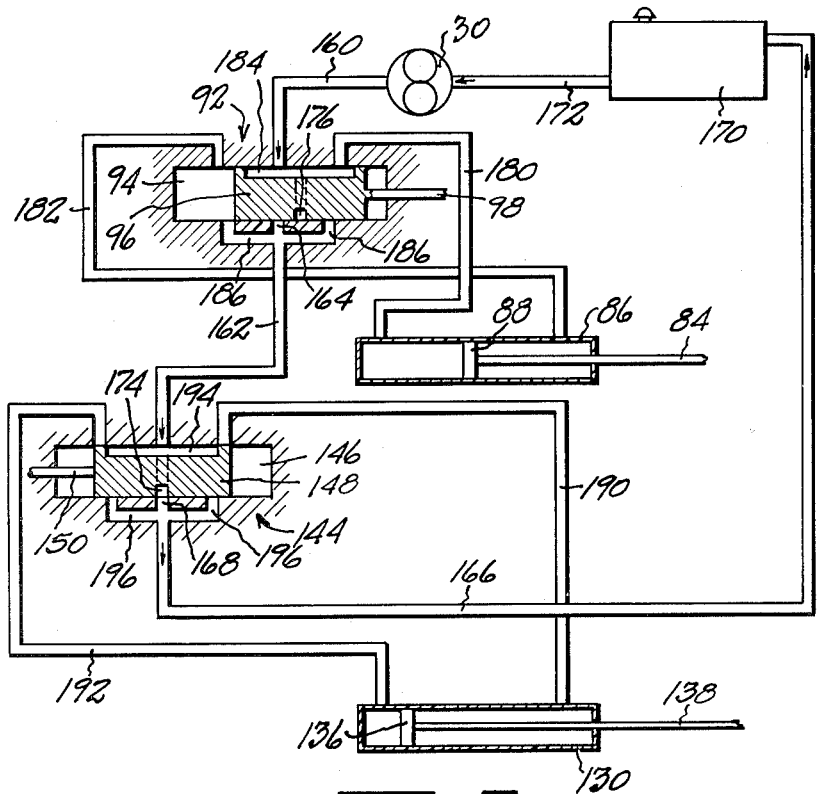
Figure 6:
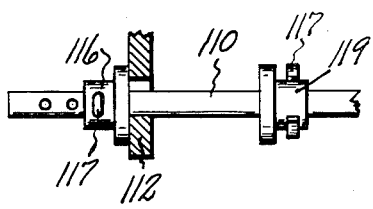

In the drawings:

Fig. 1 is a top plan view of the device;
Fig. 2 is a rear view of the device;
Fig. 3 is a side view of the device;
Fig. 4 is a fragmentary detail sectional view taken on line 4—4 of Fig. 1;
Fig. 5 is a diagrammatic view illustrating the control mechanism of the device; and
Fig. 6 is an enlarged fragmentary detail view of a modified embodiment of the device.

Referring to the drawings which illustrate the preferred embodiment of the invention, the numeral 10 designates a vehicle in the nature of a trailer supported upon wheels 12 and including a frame having longitudinal parts 14, transverse parts 16, and a tongue or draft member 18 projecting forwardly from the frame and adapted for connection with tractive means, such as a tractor or a truck. The frame includes a platform 20.

A prime mover 22 is mounted upon the platform and is preferably a gasoline engine. The engine shaft 24 mounts a plurality of pulleys or sprockets and a belt or other power-transmitting member 26 is trained around one such pulley 27 and around a pulley 28 mounted upon the shaft of a pump 30, preferably also mounted upon the platform 20. One or more power-transmitting members, such as belts 32, are trained around pulleys or sprockets 34 mounted on the engine shaft 24 and also around pulleys or sprockets 36 mounted upon a shaft 38. The shaft 38 projects from and constitutes the input shaft of a power transmission member 40, such as a gear set having a gear shift mechanism operated by a gear shift lever 42. The transmission 40 will preferably be housed within a casing and will have a neutral position and one or more operative positions for determining the speed ratio between the driving and driven shafts thereof, although the device may have only a single operative speed relation if desired.

The transmission housing is supported by longitudinally spaced laterally projecting rigid support members 44 and 46 carried by the vehicle frame, as by one of the longitudinal frame members 14. As best illustrated in Fig. 1, the gear transmission is preferably set to extend at an angle to the frame members 14 and at one side of the frame, preferably in advance of one of the wheels 12. As illustrated in Fig. 3, the transmission member 40 is inclined vertically in a rearward and downward direction.

A universal joint (not shown) is connected to the transmission output shaft and is housed in and concentric with a flexible or swivel housing 48 carried by the transmission housing. A tubular housing 50 extends downwardly and rearwardly from and is connected to housing 48. Housing 50 encases a driven shaft 52 which has a driving connection with the transmission 40 through said universal joint. The tubular housing 50 has a transverse plate 54 fixed thereto at its front end. To this plate is bolted a second plate 56. The plate 56 mounts a longitudinally forwardly projecting finger 58 which extends through an opening in the plate or member 46 with a loose fit which accommodates shifting of the tubular member 50 around the center provided by the universal joint housing 48. One or the other of the plates 54 and 56, here shown in Fig. 4 as plate 54, has openings, here shown as an arcuate series of spaced apertures 60, formed therein and arranged concentrically of the tube 50. Bolts 62 or other securing means pass through selected ones of the apertures 60 and through the other of the two plates 54, 56 for the purpose of maintaining the two plates 54 and 56 in selected rotative orientation relative to each other. By virtue of this arrangement the rotative position of the tube 50 may be varied at will, is normally maintained in any adjustment desired, and maintains that adjustment as the tube 50 swings about the joint housing 48 as a center.

At its rear end the tube 50 is connected with a gear housing 64 having a downwardly projecting bearing 66 for a shaft which mounts a rotatable hoe head 68. The hoe head 68 preferably includes a backing plate 70 which is substantially flat and a concavo-convex plate 72 secured at the bottom of the plate 70 substantially concentric therewith with its convex face outermost or lowermost. The member 72 is preferably of smaller diameter than the plate 70, and the marginal portion of the plate 70 serves as means to secure ground-engaging tooth members 74 which may have screw-threaded shank portions and which are secured in desired position by means of nuts 76. Vanes 78 are prefarbly secured to the plate 70 at its upper face and extend substantially radially thereof, said vanes preferably constitute short lengths of angle iron members, as shown. The convex member 72 normally bears upon the surface of the ground to be worked, as illustrated in Fig. 3. The member 68 will be driven by suitable gearing (not shown) housed within the casing 64 and having a driving connection with the shaft 52 in the manner well understood in the art.

The tubular housing 50 mounts a web 80 intermediate its ends, and to this web is pivoted at 82 the plunger 84 of a hydraulic power member of the cylinder-piston type and including the cylinder 86 and piston 88. The cylinder 86 has a bracket portion 89 which is pivoted at 90 to the rigid frame preferably at the longitudinal central frame part of tongue 18 thereof. The hydraulic power unit 86 is of the double acting type and is positioned substantially transversely of the frame so that the application of power thereto in one direction will urge the shaft 84 outwardly to swing the tubular member 50 outwardly and to the right as illustrated in Fig. 1, whereas reverse operation of the power member will draw the shaft 84 inwardly and swing the tube 50 to the left as viewed in Fig. 1.

The hydraulic power member 86 is controlled by a valve 92 which is preferably of the type having a housing providing an elongated cylindrical bore 94 within which a valve member 96 is slidable endwise to establish communication between selected ports of the valve as will be described hereinafter. The sliding member 96 is actuated by a stem member 98 projecting axially therefrom. In this instance the valve member 92 is preferably mounted upon the tubular member 50 for movement therewith relative to the trailer frame 10.

A feeler in the nature of an elongated rigid tube or shaft 100 is pivoted at its front end at 102 to the front end portion of the tube 50. The tube 100 is positioned to extend alongside the tube 50 and is of a length substantially equal to the overall length of the tube 50 and the tool mounted thereby. Thus the rear end portion 104 of the tube is preferably bent arcuately and outwardly so as to extend partly around the tool head 70. The tube 100 mounts a bracket 106 intermediate its ends at which the stem member 98 is connected. Since the tube 100 is pivoted upon the tube 50, it will be apparent that the valve 92 is caused to operate upon movement of the feeler 100 relative to the tube 50.

A bracket 108 is fixed to the tube 100 intermediate its length and preferably adjacent to the valve 92. This bracket has a rigid rod 110 pivotally connected thereto. The rod 110 extends transversely inwardly and passes through an opening in a guide member 112 carried by one of the longitudinal frame members 14. An elongated coil spring 114 is connected at one end to the rod 110 and at its other end to the tube 50, or some means associated therewith and here shown as the web 80. The spring serves as a means to urge the rod 110 in an outward direction, that is, toward the right as viewed in Fig. 1.

A stop 116, such as a nut, is mounted on the rod 110 and serves as means to limit the outward movement of the rod 110 by the spring 114. The rod 110 is moved endwise in an inward direction as the feeler 100 swings to the left as viewed in Fig. 1, and a stop may be provided to limit inward movement of the rod 110. As shown in Fig. 2 this stop may comprise a plate 118 projecting below the central tongue member 18 of the frame in line with the rod 110. This plate 118 will preferably be of concavo-convex form, as seen in Fig. 2, with its curvature in its vertical direction. This means provides for uniformity of inner limit position of the rod 110 regardless of variations in the vertical tilt of the tube 50. An alternative stop for limiting the inward movement of the rod 110 is illustrated in Fig. 6 and consists of a nut or stop member 119 mounted on the rod 110 and adapted to engage the bracket 112. Thus in the Fig. 6 construction, both stops 116 and 119 are shown mounted upon the rod 110 and secured by cotterpins 117 for adjustable connection on the rod 110. It is possible to vary the range of lateral swinging movement of the feeler 100 by changing the adjustment of the stops upon the rod.

The frame of the trailer preferably includes a rigid upwardly projecting member 120, as best seen in Fig. 2, and to this upright is pivoted at 122 an elongated rigid transversely extending arm 124 which has connected thereto at its free end one end of a chain 126. The other end of the chain 126 is anchored at 128 to the tube 50 intermediate its length. A hydraulic power member includes a cylinder 130 having a bracket 132 and is pivoted at 134 to a fixed part of the frame 10. The cylinder 130 houses a piston 136 connected by a rod 138 to a head 140 which is pivoted at 142 to the arm 124 intermediate the length thereof. The relation of the parts is such that the extension of the piston rod 138 from the cylinder 130 will raise the arm 124 to take up the slack in the chain 126 and, thereafter, to lift the tube 50 and the tool head 68 upwardly clear of the ground to a free transport position.

The hydraulic power member 130 is preferably of the double acting type and is controlled by a valve 144 which is preferably of the type similar to the valve 92 in that it has a housing with a cylindrical bore 146 in which is slidable lengthwise a valve member 148 mounting a rod 150 which extends outwardly of the housing of the valve and is accessible for manipulation to control the position of the valve. Suitable means (not shown) may be provided in the device for manually operating the plunger 150 for the purpose of controlling the valve.

The hydraulic mechanism of the device is connected in a circuit, as best illustrated in Fig. 5. As here illustrated, this circuit is powered by the pump 30 which is connected by a conduit 160 to a port of the valve 92 mid-length of the bore 94. A conduit 162 connects the valve 92 at a port 164 mid-length of the bore 94 with the valve 144 at a point mid-length of the bore 146 thereof. A conduit 166 is connected at a port 168 mid-length of the bore 146 of the valve 144 and extends to a reservoir 170. A conduit 172 connects the reservoir 170 with the pump 30. In the normal position of the valves 92 and 144 the valve plungers 96 and 148 thereof will be centrally positioned in the bores 94 and 146, respectively. The valve member 148 in the valve 144 is so positioned that the cylindrical groove 174 centrally therein registers with the inlet port and communicates with the conduit 162 and the outlet port 168 for flow between those conduits.

In Fig. 5 the movable member 96 of the valve 92 is shown off center, and the transverse central bore 176 thereof is out of register with the outlet port 164. It will be understood that the member 96 will normally be positioned to effect registration between the inlet port and the inlet conduit 160, the transverse passage or groove 176 and the outlet port 164.

A conduit 180 connects one end of the cylinder 86 and the bore 94 of the valve 92 adjacent to and preferably in longitudinal alignment with the inlet port at which the conduit 160 is connected. Another conduit 182 connects the other end of the cylinder 86 with the bore 94 of the valve 92 spaced from and in substantially longitudinal alignment with the port at which the inlet conduit 160 is connected. As best seen in Fig. 5, the inlet port with which the inlet conduit 160 is connected is positioned between and substantially equi-spaced from the ports at which the tubes or conduits 180 and 182 are connected to the bore 94 of the valve 92. A longitudinally elongated passage 184 is formed in the valve member 96 to register with the port connected with the inlet conduit 160. This groove 184 is of a length less than the spacing between the ports at which the conduits 180 and 182 are connected, buit greater than the spacing between the inlet port at which the tube 160 is connected and either of the ports at which the ports 180 and 182 are connected. The valve 92 has by-passes 186 communicating with the conduit 162 and extending longitudinally in each direction from the port 164 for communication with the valve bore 94 adjacent to the ports to which the conduits 180 and 182 are respectively connected.

A conduit 190 is connected to one end of the cylinder 130 and to the bore 146 of the valve 144 spaced from and in substantially longitudinal alignment with the inlet port of said valve at which the conduit 162 is connected. A second conduit 192 is connected to the opposite end of the cylinder 130 and to the opposite end of the valve bore 146, again in longitudinal alignment with the port at which the conduit 162 is connected. The valve member 148 has a longitudinal groove 194 therein communicating with the port at which the conduit 162 is connected and adapted for communication with one or the other of the ports at which the conduits 190 and 192 are connected. The housing of the valve 144 has by-passes 196 formed therein extending longitudinally from the port 168 for communication with the valve bore 146 adjacent to the ports at which the conduits 190 and 192 are connected.

The device is intended for use in cultivating in orchards, vinyards, berry patches and the like, and its primary purpose is to cultivate the ground between adjacent plants. Thus, as illustrated in Fig. 1, plants or trees 200 may be located in rows and it is desired to cultivate between these plants and around them. More particularly, it is desired that the center of the cultivator head follow a path as illustrated in dotted lines in Fig. 1, and consisting of curved path parts 202 around and concentric with the plants 200 and straight path portions 204 between such curved parts 202. For this purpose the implement is drawn in a path parallel to the line 204, that is, parallel to the row of plants 200. In the normal position of the parts the feeler 100 will be located as illustrated in full lines in Fig. 1, and the cultivator head will be located as illustrated at A in Fig. 1. In this connection it will be understood that Fig. 1 illustrates a position of the head 70 in which it is moving toward position A from an inner limit position B, as shown by the dotted outline of the member 70.

As the device is towed or drawn longitudinally by connection of the draft bar or tongue 18 with a tractive vehicle, and assuming that the engine 22 is operating and that each of the valves is in a neutral position, the cultivator will operate along the straight line portion 204 of its path of movement. During this time the load upon the engine 22 is limited to the rotation of the cultivator 68. Thus, the engine drive is transmitted from the pulleys 34, through the belts 32, the pulley 36, the shaft 38, the transmission 40, the universal joint, and the shaft 52 to the rotating cultivator head 68. The engine also drives the pump 30 through the belt 26, but during the time that the device is traveling in straight portion 204 of its path, the pump is not under load and, by virtue of the centered position of the valve element 96 in the valve 92 and of the valve element 148 in the valve 144, a free flow of liquid occurs from pump 30 through conduit 160, valve 92, conduit 162, valve 144, conduit 166, reservoir 170 and conduit 172 back to the pump. Since this is a free flow, the flow imposes no substantial load upon the engine. If no obstacle is encountered, the device will continue to operate in a straight line with cultivation occurring to one side of the wheeled vehicle.

When an obstacle is encountered, that is, when the feeler 100, as at the curved portion 104 thereof, encounters an obstacle, such as a bush, a vine, a tree or a post, the continued forward movement of the device in a straight line results in swinging of the feeler in an inward direction, that is, toward the left as viewed in Fig. 1, as to an inner limit position as illustrated partially in dotted lines in Fig. 1. The inward movement of the feeler proceeds against the action of the spring 114 and causes the feeler to move toward the tube 50. This movement acts upon the stem 98 of the valve 92 to move it toward the left toward an extreme position opposite that illustrated in Fig. 5 and a position in which the groove 184 is placed in communication with the intake port connected with conduit 160 and the port connected with the conduit 182. Consequently, the flow of fluid in the system is diverted and proceeds as follows: From the pump 30 the liquid passes through the conduit 160, the groove 184, the conduit 182 to the cylinder 86 where it acts upon the piston 88 to move the same toward the left, thereby drawing inwardly upon the stem 84 and causing the tube 50 to start to swing toward the left. The movement of the piston toward the left in the cylinder 86 displaces the liquid from the left-hand end of the cylinder, and that liquid is exhausted by conduit 180 into the bore 94 for entry into the right-hand by-pass 186 and into the conduit 162. Thereupon, the liquid flows through the centered or neutrally positioned valve 144 to the conduit 166 and the reservoir 170. The inward movement of the feeler 100 proceeds either until the obstacle is passed or until the movement of the rod is stopped, as by the stop 118 of Fig. 2 or the stop 119 of Fig. 6. The feeler will preferably have some resilience so that limitation of its inward movement at the bracket 108 will not prevent its flexing at its free end if that is required in order for the end of the feeler to pass the obstacle 200.

After the valve 92 is adjusted to cause the power unit 86 to start moving the tube 50 inwardly, that operation continues until the tube swings to a position which carries the valve to a neutral position. In this connection the feeler moves inwardly to its limit position and this effects the setting of the valve 92, so that the tube 50 does not move until after the feeler has started to move. In other words there is a lag in the movement of the tube 50 compared to the movement of the feeler 100. This lag causes the feeler 100 to assume its innermost position before the tube 50 assumes a corresponding position and, therefore, movement of the tube 50 continues after the feeler has come to rest at an inner limit position which enables it to pass the obstacle 200. As the movement of the tube 50 continues when the feeler has reached its inner limit position as defined by a stop, such as 118 or 119, the return of the valve to neutral is effected by the continued swinging of the tube 50. Stated differently, the feeler 100 has a normal angular displacement or spacing relative to the tube 50 and the power member 86 is so controlled by the valve 92 as to attempt to maintain that relationship. Thus, the operation of the tube 50 continues after the feeler comes to rest, until such time as the valve member 96 again assumes a centered position in the valve 92 as occurs when the desired relationship between the feeler and the tube exists. This operation occurs as follows: Assuming that the feeler 100 has been swung to the dotted line position in Fig. 1, thus moving the member 96 of the valve 92 to the extreme of movement opposite that illustrated in Fig. 5, the continued operation of the cylinder piston unit 86, 88 will act to swing the tube 50 and the cultivator 70 toward position B. As position B is approached, a pull is exerted upon the valve member 96 by spring 114 to move it toward a neutral position.

After the implement has passed the obstacle 200, or has partially passed the same, so that the feeler can start to swing to the right as viewed in Fig. 1 under the influence of the spring 114, the movement of the feeler in that direction operates the stem 98 of the valve 92 to position the control circuit as illustrated in Fig. 5. Thus liquid flowing from the pump through the conduit 160 enters the valve bore 94 and passes through the channel or groove 184 to enter the conduit 180 and the cylinder 86 to exert pressure against the piston 88 and cause the plunger 84 to move toward the right, thereby causing the tube 50 to be moved in a direction to follow the feeler. The right-hand end of the cylinder is opened into communication with the valve bore 94 through the conduit 182 and liquid passes therefrom through the left by-pass 186 into the conduit 162. The stop 116 limits the outward movement of the rod 110 of the feeler 100. Consequently, the continuance of the operation of the device, insofar as the fluid pressure members are concerned, results in a delayed follow-up action in the movement of the tube 50 relative to the movement of the feeler 100. As the tube 50 swings toward position A normal with respect to the spring-urged position of the feeler 100, the movement of the valve housing 92 relative to the stem 98 of the valve element 96 causes the member 96 to approach and reach a neutral position by the time the cultivator 70 reaches position A.

It will be apparent from the foregoing that wholly automatic operation of the device is secured which is simple and trouble-free in character. The feeler changes its position as obstacles are encountered, and the cultivator follows changes in position of the feeler. The extent to which the cultivator changes its position depends upon the movement of the feeler and, therefore, accommodates within limits variable lateral displacement as required to successfully pass and cultivate around successive obstacles or plants in a row. This is important because it insured that cultivation will proceed in a definite relation to each obstacle so as to provide uniformity of cultivation and completeness of cultivation within minimum occurrence of uncultivated areas around each plant.

It will be apparent that the system reduces to a minimum the load under which the engine operates normally. Thus, in selecting an engine, its power may be determined by its overload characteristics, and an engine of lower power can be utilized than if the pump 30 operated continuously under load. Stated differently, the operation of the pump to swing the cultivator head 70 laterally can occur under an overload condition without detriment or disadvantage because of the fact that such condition is momentary only and the overload is not detrimental or injurious to the system.

When the device is not in use and it is desired to move the same from storage to working position, or return, the plunger 150 of the valve 144 may be operated manually to shift the valve element 148 to desired control position, for example, to shift the same toward the left as viewed in Fig. 5. This will occur at a time when the tube 50 is in its normal position so that operation of the hydraulic power unit 86 will not occur. The hydraulic circuit which then exists will be as follows: from pump 30, through conduit 160, through the neutrally positioned valve 92, through conduit 162, passage 194, conduit 192, to the cylinder 130, where it acts against the piston 136 to project the piston rod 138 toward the right. Such movement swings the arm 124 upwardly about its pivot axis 122 and takes up the slack in the chain 126, so that the tube 50 can be swung upwardly to move the cultivator head 68 above and clear of the ground. When the device reaches desired elevation, the valve 144 is returned to the neutral position as illustrated in Fig. 5, so that both conduits 190 and 192 are closed. It will be understood, of course, that during the elevating operation liquid at the right of the piston 136 in the cylinder 130 will be discharged through the conduit 190, the valve bore 146, the right-hand by-pass 196, and the conduit 166 to the reservoir 170. During this time the engine 22 will preferably be relieved from the load of the cultivator by operation of the gear shift lever 42 to place the transmission 40 in a neutral position so that the head 70 will be stationary. In other words, the engine 22 is operating under idling condition except as a load is imposed by the setting of the valve 144 to actuate the cylinder 130. When it is desired to again lower the cultivator or head, the valve member 148 is manipulated by moving it toward the right as viewed in Fig. 5, thereby establishing a path of flow to and through the cylinder member 130 which is the reverse of that above described, and causing fluid pressure to be exerted against the piston 136 in a direction toward the left as viewed in Fig. 5.

It will be understood that the control of the member 150 can be effected through remote positioning mechanism if desired. Thus wires, cables or the like may be connected to the member 150 and extend to a tractor adjacent the operator's seat so that the operator need not dismount in order to manipulate the device. It also is possible to provide a supplemental control of the valve 92 in a similar manner by providing a connection for operating the valve stem 98 thereof through a remote control mechanism extending to or adjacent the operator's seat upon a tractor or tractive vehicle.

One of the important characteristics of this device is the fact that it will cultivate the ground uniformly and to a depth as selected. Thus the member 72 rides upon the surface of the ground and forms means to limit the depth to which the teeth 74 penetrate the ground. At the same time the entire cultivator head and the rear end of the tube 50 and associated drive mechanism in housing 64 is unsupported and the weight of these parts is sufficient to insure penetration of the working teeth 74 into the ground.

The working attitude of the head 68 may be varied. Thus, if it is desired to cultivate in a manner to throw dirt toward the plants 200, the head 70 may be tilted to desired position by rotating the tube 50. This is accomplished by the mechanism illustrated in Fig. 4, and particularly, by rotative adjustment of the plates 54 and 56. This action occurs without in any way interfering with the operation of the mechanism, and for this purpose it will be understood that the connections of the various operating parts, that is, the connections between the parts 50 and 100 at 122, between the parts 98 and 106, between the parts 108 and 110, and between the parts 82 and 84, will either be loose or will be swivel joints so as to accommodate a limited amount of rocking movement of the tube 50 without detracting from the efficient operation of the device. In the preferred form, the feeler 100 will be of light weight, so it is entirely supported at points 102 and 106, with its end portion 104 located above ground level when the head is operative and then teeth 74 penetrate the ground.

While the preferred embodiment of the invention has been illustrated and described, it will be understood that changes in the construction may be made within the scope of the appended claims without departing from the spirit of the invention.

I claim:

1. A cultivating device comprising a support, an elongated tubular member, a universal joint connecting the front end of said member to said support to extend rearwardly and downwardly alongside said support, a rotatable cultivator unit carried by the rear end of said member and having a vertically inclined axis substantially perpendicular to said member, said cultivator unit including a part substantially concentric with said axis and having a convex bottom soil-engaging surface and tooth members adjustably carried by said part eccentrically thereof and projecting below said surface, drive means partially housed in said tubular member for rotating said unit, power-actuated means on said support for swinging said member to shift said cultivator unit laterally, and loosely interfitting rigid members alongside said universal joint and carried respectively by said tubular member and said support for restraining said tubular member against rotation on its axis.

2. A cultivating device comprising a support, an elongated tubular member, a universal joint connecting the front end of said member to said support to extend rearwardly and downwardly alongside said support, a rotatable cultivator unit carried by the rear end of said member and having a vertically inclined axis substantially perpendicular to said member, said cultivator unit including a part substantially concentric with said axis and having a convex bottom soil-engaging surface and tooth members adjustably carried by said part eccentrically thereof and projecting below said surface, drive means partially housed in said tubular member for rotating said unit, power-actuated means on said support for swinging said member to shift said cultivator unit laterally, a transverse member rotatable relative to said tubular member adjacent said universal joint, means locking said member in selected rotative position on said tubular member, an apertured member carried by said support adjacent said universal joint and confronting said transverse member, and a finger projecting from said transverse member and projecting loosely through an aperture of said apertured member.

References Cited in the file of this patent

UNITED STATES PATENTS

| | | |
|---|---|---|
| 395,364 | Stump | Jan. 1, 1889 |
| 1,307,672 | Johnson | June 24, 1919 |
| 1,959,942 | Avignon | May 22, 1934 |
| 2,193,157 | Ayo | Mar. 12, 1940 |
| 2,532,424 | Rose | Dec. 5, 1950 |
| 2,539,934 | Smith et al. | Jan. 30, 1951 |
| 2,552,710 | Dodson | May 15, 1951 |
| 2,608,146 | Lund | Aug. 26, 1952 |
| 2,694,355 | Pertics et al. | Nov. 16, 1954 |